US009280689B2

(12) United States Patent
Ling

(10) Patent No.: US 9,280,689 B2
(45) Date of Patent: Mar. 8, 2016

(54) METHOD AND APPARATUS FOR CONDUCTING OFFLINE COMMERCE TRANSACTIONS

(76) Inventor: Marvin T. Ling, Scottsdale, AZ (US)

( * ) Notice: Subject to any disclaimer, the term of this patent is extended or adjusted under 35 U.S.C. 154(b) by 101 days.

(21) Appl. No.: 13/816,955

(22) PCT Filed: Aug. 16, 2011

(86) PCT No.: PCT/US2011/047862
§ 371 (c)(1),
(2), (4) Date: Feb. 14, 2013

(87) PCT Pub. No.: WO2012/039859
PCT Pub. Date: Mar. 29, 2012

(65) Prior Publication Data
US 2013/0140361 A1    Jun. 6, 2013

Related U.S. Application Data

(60) Provisional application No. 61/385,022, filed on Sep. 21, 2010.

(51) Int. Cl.
*G06K 5/00* (2006.01)
*G06K 15/00* (2006.01)
*G06Q 20/32* (2012.01)
*G06K 19/06* (2006.01)
*G06K 19/14* (2006.01)

(52) U.S. Cl.
CPC ............ *G06K 5/00* (2013.01); *G06K 19/06028* (2013.01); *G06K 19/14* (2013.01); *G06Q 20/3274* (2013.01)

(58) Field of Classification Search
USPC ............ 235/375, 380, 449, 472.01, 492, 493, 235/383, 385, 451
See application file for complete search history.

(56) References Cited

U.S. PATENT DOCUMENTS

| 7,146,344 | B2 | 12/2006 | Wankmueller | |
| 7,249,060 | B2 | 7/2007 | Ling | |
| 7,258,266 | B1 | 8/2007 | Bowe, Jr. | |
| 7,359,880 | B2 | 4/2008 | Abel et al. | |
| 7,676,432 | B2 | 3/2010 | Ling | |
| 2002/0111907 | A1* | 8/2002 | Ling | 705/41 |
| 2008/0103984 | A1* | 5/2008 | Choe et al. | 705/76 |
| 2008/0210754 | A1 | 9/2008 | Lovett | |
| 2008/0222048 | A1* | 9/2008 | Higgins | G06Q 20/12 705/67 |
| 2009/0281904 | A1* | 11/2009 | Pharris | 705/17 |
| 2010/0138344 | A1 | 6/2010 | Wong | |
| 2012/0054046 | A1* | 3/2012 | Albisu | 705/16 |
| 2013/0087612 | A1* | 4/2013 | Locher | 235/380 |

* cited by examiner

Primary Examiner — Tuyen K Vo
(74) Attorney, Agent, or Firm — Cahill Glazer PLC

(57) ABSTRACT

Methods and apparatus for conducting offline commerce transactions that use a barcode as an alternative means for personal identification. The user represented in the bar code format, User ID Barcode, is generated from a number that uniquely identifies the user. Numbers such as a cell phone number or a credit card number may be used to generate the User ID Barcode. These numbers are prefixed with a special character before they are converted to the barcode format. Prefixing a special character is necessary so that the bar code generated can be distinguished from any bar code representing products being sold. If a credit card number is used, the User ID Barcode is printed on the back of the credit card which then becomes a 2 and 1 credit card.

3 Claims, 16 Drawing Sheets

AT = Available amount of fund
MT = Initial minimum amount of deposit (Top Off amount)
CG = Cost of goods purchased
AS = Amount of fund short to make the purchase
NT = Amount of new deposit AT = AT - CG
If AT ≤ 0 then AS = - (AT - CG)
NT = AS + MT AC = Available credit limit amount MT = Initial maximum credit limit allowed (Negative Top Off amount)

CG = Cost of good

AS = Amount of credit limit short to make the purchase

PA = Payment amount

AC = AC - CG

If AC ≤ 0 then AS = - (AC - CG)

PA = AS + MT

METHOD AND APPARATUS FOR CONDUCTING OFFLINE COMMERCE TRANSACTIONS

RELATED APPLICATIONS

This application is related to and claims priority to a provisional application entitled "METHOD AND APPARATUS FOR CONDUCTING OFF LINE COMMERCE TRANSACTIONS USING A BAR CODE GENERATED FROM A CELL PHONE NUMBER AS AN ALTERNATIVE MEANS TO A CREDIT CARD WITH ENHANCED SECURITY" filed Sep. 21, 2010, and assigned Ser. No. 61/385,022.

FIELD OF THE INVENTION

The present invention relates to methods and apparatus for conducting offline commerce transactions using the user ID Barcode as the user identifier for purchasing goods priced at micro payment or non-micro payment level using the fund or credit limit available at the user's account in the server identified as a User Vendor Management Server (UVM).

BACKGROUND OF THE INVENTION

Users currently pay for goods priced in micro payment levels, such as five cents or ten cents using cash. Such payments are not made with credit cards because the cost of the credit card transaction processing is too high, making it impractical both for vendors and credit card companies to accept the use of a credit card for micro payment purchases.

The cell phone imbedded with a RFID (Radio Frequency Identification) tag or NFC chip (Near Field Communication Chip) allows loading of the tag or chip with cash using a special machine which then allows the payment of goods in micro payment levels or non-micro payment levels. A non-contact RFID tag or NFC reader is required to subtract the amount of the transaction from the cash available in RFID tag or NFC chip and record the transaction data. Cell phones are presently being offered with imbedded NFC chips. This fact indicates companies are capturing micro payment transaction market currently being made in cash and ignored by credit card companies.

These payment methods require the user to load the cell phone with money using a special machine available only at banks or limited places. Also, a non-contact card reader is required at the vendor site to read and subtract the purchasing amount from the amount of money within the user's cell phone. Very few vendors have a non-contact card reader. Therefore these payment methods are inconvenient for users. Furthermore, if the user loses the cell phone, it is the same as losing cash.

Japan Railway issues SUICA cards and subway systems issue PASMO cards both of which have built-in IC chips. SUICA and PASMO cards allows passengers to enter and exit train stations very quickly simply by flashing remotely their SUICA or PASMO card at the non-contact card readers installed at the gate. There are some vendors inside and near JR and subway stations that have non-contact card readers, allowing users to purchase low cost items such as a bottle of water, gum or a magazine, etc. It is said that there are about 20,000 non-contact card readers in Japan. Most of these card readers are used by Japan Railway and subway systems for reading train tickets. There are over 800,000 regular card readers for conventional credit cards in vendor sites across the entire Japan. However, all vendors worldwide have barcode scanners with cash registers. While it appears that the application for RFID or NFC technologies are very convenient, they are best suited for transportation but not suited for purchasing transactions.

SUICA card issued by Japan Railway (JR) loaded with pre-paid amount of money are used by over 10 millions of users for train tickets and purchases of low cost goods at participating vendors near JR stations in Japan. SUICA card requires a special non-contact card reader therefore the use of SUICA card is limited to vendors having a non-contact card reader. Similarly, PASMO card issued by subway systems companies for purchasing subway train tickets and purchasing low cost goods at participating vendors near subway stations in Japan also are being used by millions of users. PASMO card also uses a non-contact card reader. Edy card issued by SONY Corporation for purchasing goods requires the payment of subscription fee and service charges are relatively high. Edy card also requires loading of cash and requires a non-contact card reader.

JCB, the largest credit card company in Japan issued QUICPay card for micro payments. QUICPAY is a post pay card like a conventional credit card. QUICPay card also requires non-contact card reader. SUICA card, PASMO card, Edy card and QUIC Pay card do allow payment of purchases priced at micro payment level. SUICA card, PASMO card and Edy card has the disadvantage in that if the card is lost, the remaining money in the card is lost. SUICA card, PASMO card, Edy card and QUICPay card can be used only at vendors having the special non-contact card reader and they are used only within Japan since the special non-contact card reader are rarely available outside of Japan.

SUMMARY OF THE INVENTION

The present invention introduces a new method for identifying a user using the User ID Barcode, allowing the user to charge purchasing of goods priced in micro payment level or non-micro payment level either offline or online at a participating vendor site.

The user ID Barcode converts a unique number such as the cell phone number or the credit card number prefixed with a special character like "?" into the barcode format. The User ID Barcode can be downloaded into the user's cell phone and displayed in the cell phone window or printed in the back of the user's credit card to become a 2 in 1 credit card. Alternatively, the barcode may be printed on a sticker or label secured to a carrying member such as the cell phone or credit card. One of several means to capture the User ID Barcode in the present invention is to allow the cashier to use a barcode scanner available at the cash register. It is to be noted that practically all store cash registers worldwide are equipped with barcode scanners.

If the cell phone number is used to generate the User ID Barcode and it is downloaded in the cell phone, or is printed on a label secured to the cell phone, the cell phone can be used to make purchases of goods from participating vendors. The cashier captures the User ID Barcode using the barcode scanner available with the cash register. The cell phone acts like a credit card in this case.

If the User ID Barcode is generated using the credit card number and printed on the back of a regular credit card or on a label secured to the credit card, the card becomes a 2 in 1 credit card. For goods priced in micro payment level, the barcode scanner is used to capture the User ID Barcode. For goods priced in non-micro payment level, the conventional credit card reader is used to capture the credit card number.

The present system and method uses the cell phone numbers or the credit card number to identify the user who makes purchases of goods at participating vendor sites. Other identifiers such as the driving license number or the social security number etc. may also be used.

There are other methods to capture the user's cell phone number or credit card number. These may include the use of Radio Frequency Identification (RFID) or Near Filed Communication (NFC) technologies. A RFID tag or a NFC is attached on the back of the cell phone or built in the logic card inside the cell phone. Or a card with built in RFID tag or NFC chip may also be issued. The cash register in the vendor site will have a RFID or NFC reader to read the cell phone number or credit card number. Alternatively, the cashier may capture the user ID using the keyboard at the cash register.

The cell phone number or the credit card number is prefixed with a special character such as "?" before they are converted into the barcode format to become the User ID Barcode. The special character as a prefix or suffix or both as the beginning and the ending character is required so that the system can distinguish the User ID Barcode from the product data barcode within the data captured by the barcode scanner.

The User ID Barcode is encrypted for security. The encryption algorithm can be changed with time to provide additional level of security for the user. Therefore the encryption algorithm is "time variant". The encryption algorithm for the User ID Barcode can be different for the different users. Therefore the encryption algorithm is also "user variant". For increased security for the users, the User ID Barcode may be encrypted using both the time variant and the user variant encryptions algorithms.

The present method and system introduces a server called User Vendor Management Server (UVM) for the management of users and vendors. The UVM processes all purchasing transactions between the user and the vendor. The UVM may be operated in a prepaid mode or a post pay mode. For the prepaid mode, the user registers with the UVM and creates an account. The user deposits a certain amount of funds as required by the operator of the UVM, using his credit card or the bank account. This amount is called the Top Off amount. The payment for the purchase transaction is made from the fund available within the user's UVM account. When the fund available in the user's UVM account is not enough to cover the cost of the purchase, the method and apparatus of the present invention provides an easy and fast method for the user to add to the fund instantly to the user's UVM account. The amount to be added to the user's UVM account, using the credit card or the bank account is the shortage of the cost of the purchase plus the Top Off amount such that the available fund in the user's UVM account after the completion of the purchase is restored to the Top Off amount.

In the post pay mode, the user registers at the UVM and creates an account. The UVM provides the user's UVM account a certain available credit limit as pre-determined by the UVM operator. This amount is called the Negative Top Off amount. The payment for the purchase transaction is made from the available credit limit of the user's UVM account. When the cumulative purchase amount reaches or exceeds the available credit limit, the present invention charges the user's credit card or the bank account provided by the user at the time of registration, the amount so that the user can make the purchase and bring the user's UVM account balance to zero and restore the user's available credit limit to the Negative Top Off amount.

This automatic Top Off instant add fund method in the pre-paid mode and automatic Negative Top Off instant charge to the user's credit card or the bank account in the post pay mode avoids the user or cashier otherwise having to manually enter the payment amount and therefore it provides convenience and speedy payment process.

The present invention provides fast checkout at the vendor cashier without the need to sign the sales receipt or enter PIN thus provide convenience to the user and reduces the vendor operation cost. Further, the present invention allows the user to set spending thresholds either per purchase, per day, per week or per month.

The UVM may send a e-mail to the user for each and every purchase that the user made using the User ID Barcode, indicating the vendor name, the amount of purchases and the time and the date that the purchasing transaction has taken place. The user may check the daily transaction records by logging into the UVM transaction record pages, allowing the user to manage the account and discover early any unauthorized use of the user's account.

The present invention also provides the user a means for security and minimizes the loss allowing the user to invalidate the User ID Barcode and change the password to lock the UVM account prior to informing the UVM operator upon discovery of unauthorized use of the user's account, or in case the user looses the cell phone with the User ID Barcode being loaded inside, or a 2 in 1 credit card or the user account password is stolen, thus minimizing potential damages.

The present invention protects the user's privacy when the user makes purchases of goods either offline or online using the User ID Barcode without the need to provide each vendor the user's personal information.

The present invention allows the user to automatically register with the UVM without requiring the user to enter details of personal information, upon the user's first use of the User ID Barcode for purchasing goods. The UVM server computer may obtain user's personal information from the cell phone company's computer database or credit card company's computer database thus providing convenience to the user. Similarly, the present invention allows the vendor to automatically register with the UVM as a participating vendor, when the vendor accepts for the first time, payment of purchases from the user using the User ID Barcode. The UVM operator may contact the vendor to obtain detail vendor information at a later time and establish payment thresholds either by the amount or by the time.

In the present invention, the UVM processes the purchasing transaction without involving any third party therefore minimizing the cost of processing each purchase transaction.

The present system makes payment using the UVM account for purchasing goods priced at micro payment level or non micro payment level. Since the fund available in the user's UVM account is loaded using the user's credit card, the user will accumulate points offered by credit card companies for all purchases including purchases of low cost goods such as five cents, ten cents or few dollars in micro payment level. This is an advantage for the user.

BRIEF DESCRIPTION OF THE DRAWINGS

The above and other objects and advantages of the present invention will be apparent upon consideration of the following detailed description taken in conjunction with the accompanying drawings, in which like characters refer to like parts throughout and in which:

FIG. 1(*b*) is an overview of the purchasing transaction of the method and apparatus of the present invention using the User ID Barcode, downloaded into a cell phone or printed on the back of a credit card;

DETAILED DESCRIPTION OF THE INVENTION

Figure 1A:
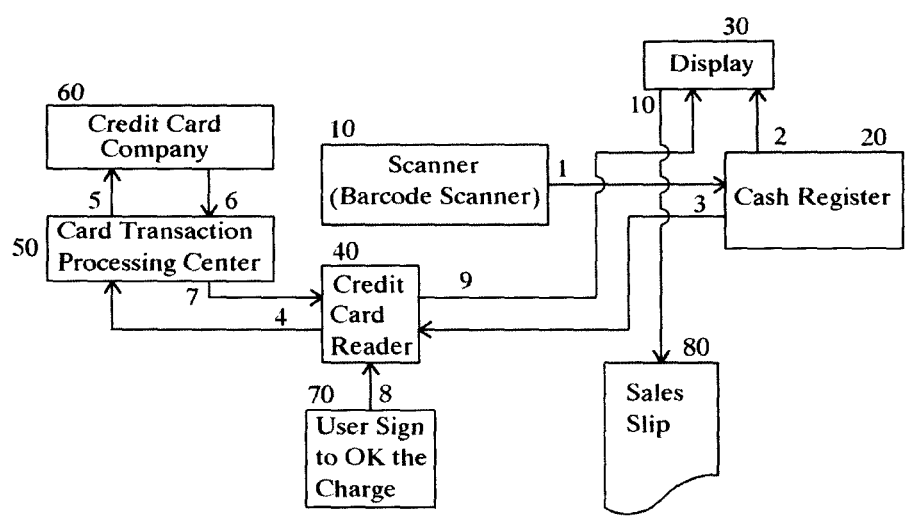
FIG. 1(*a*) is an overview of the conventional credit card purchasing transaction processing.

The present invention provides a method and system for conducting business commerce transactions in an offline environment using the User ID Barcode as an identifier for the user. A barcode, as used herein, refers to the typical optical machine-readable representation of data. The code usually identifies data concerning the object to which it is attached and is represented by varying widths and spacings of parallel lines. The data contained in the barcode is read by conventional barcode readers or scanners that optically recognize the spacings and widths of the parallel lines to derive data concerning the article to which the code is attached. The User ID Barcode is derived from the conventional barcode and includes a special character, or characters, to identify it as a personal ID code and to distinguish it from barcodes that may incorporate data relating to products or goods. The User ID Barcode can be generated from the cell phone number and downloaded into a cell phone or generated from the credit card number and printed on the back of the regular credit card, or on labels secured to the credit card, as examples.

When the User ID Barcode generated from the cell phone number is downloaded into a cell phone, the cell phone is used as an alternative means for a credit card for the payment of purchasing goods in micro payment level as well as non-micro payment level. The cashier captures the cell phone number represented in the barcode for the user identification, much the same as capturing the credit card number for the user identification. While capturing the credit card number usually uses the card reader to read the credit card number and other information written in the magnetic stripe in the back of the credit card, capturing of the cell phone number represented in the barcode needs to use other methods. One such method is to use the barcode scanner available at the vendor cash register.

When the barcode scanner is used to capture the cell phone number, it is desirable that the cell phone number is represented in the barcode format and that the cell phone number is provided with a prefix or suffix or both in the form of a special character before converting it to the barcode format to become the User ID Barcode so that the Vendor Server can distinguish the barcode representing the description and price of the goods from the barcode representing the cell phone number. To make the capturing of the cell phone number easier, it is desirable, for example, that the User ID Barcode is downloaded to the user's cell phone and displayed at the cell phone window or on a label secured to the cell phone. Alternatively, a credit card number provided with a prefix or suffix or both in the form of a special character such as "?" can be converted to a barcode format to become a User ID Barcode and printed on the back of the credit card. This card becomes the 2 in 1 credit card that can be issued for users.

The "2 in 1 card" can be used for charging purchase of goods priced in both micro payment and non-micro payment levels. For payment of regularly priced goods, the cashier swipes the credit card at the credit card reader. For payment of low cost item in micro payment level, the cashier captures the Used ID Barcode using the barcode scanner.

The User ID Barcode is encrypted for security. The encryption algorithm can be changed with time to provide additional level of security for the user. Therefore the encryption algorithm is "time variant". The encryption algorithm for the User ID Barcode can be different for the different users. Therefore the encryption algorithm is also "user variant". For increased security for the users, the User ID Barcode may be encrypted using both the time variant and the user variant encryptions algorithms.

The capturing of the user identification number may be accomplished by using other techniques such as RFID or NFC instead of the barcode scanner. Keying the user identification number may also be used. While the user's cell phone number or credit card number is used for the identification of the user in the present invention, other means for the user identification, for example, user driver's license number or user's social security number may also be used as the user identification for the present invention. Each of these other identifiers are provided with a special character for conversion into the barcode format to become the User ID Barcode.

Conventional credit cards allow users to purchase goods having a value above a certain minimum. The minimum may be, for example, one or two dollars or more. Charges below this minimum are usually cost prohibitive for the transaction processing; the vendor would prefer customers to pay for such purchases in cash. The cost of the credit card transaction processing includes a fixed amount that usually is set at approximately 35 cents per transaction plus a certain percentage of the amount of the transaction. This means that any purchase of goods costing in the micro payment level will need to be made by some other method such as a debit card or cash. While debit cards allow payment of purchases in the micro payment level, using a debit card often requires entering of a PIN, and/or the signature on a sales receipt. Payments made in cash require the user to carry cash, and preferably in small denominations, so that the payment can easily be made. Otherwise, the cashier needs to count the money and provide change. Both payment methods take time and slow the completion of the purchasing transaction.

The present method and system uses the User ID Barcode for personal identification. When the User ID Barcode is downloaded into the user's cell phone, the cell phone can be used to make purchases of goods similar to a conventional credit card except the use of User ID Barcode allows the user to charge goods, costing in the micro payment level in addition to purchase of normal price range products. The conventional credit card typically does not allow charging goods costing in micro payment levels. Furthermore, the User ID Barcode, being captured by the cashier using the scanner available at the cash register, provides fast checkout and with limited cost to the vendor for the transaction processing. Note that vendors worldwide have barcode scanners. Vendors will be required to install RFID or NFC chip reader as new investments if the system uses RFID or NFC technology.

For purchasing of goods costing in micro payment level, the present system captures the User ID Barcode using the barcode scanner available at the cash register. The system and method of the present invention provides the user with fast checkout at the cashier without having to sign the sales slip or to enter PIN. This results in fast checkout with the cashier and it provides user convenience and potentially reduces the number of cashiers and therefore reduces the vendor's operation cost. Some vendors may prefer cash transactions from cash flow point of views and avoid payments of service charges required from credit card companies but vendors, such as convenience stores that remain open until late in the night may become the target of potential robbery if the stores have too much cash in their cash registers.

The present method and system introduces a server called User Vendor Management Server (UVM) for the management of users and vendors. The UVM processes all purchasing transactions between the user and the vendor. The UVM may be operated in a prepaid mode or a post pay mode. For the prepaid mode, the user registers with the UVM and creates an account. The user deposits funds as required by the operator of the UVM, using a credit card or the bank account. This amount deposited is called the Top Off amount. The payment for the purchase transaction is made from the fund available within the user's UVM account. When the fund available in the user's UVM account is not enough to cover the cost of the purchase, the method and apparatus of the present invention provides an easy and fast method for the user to add funds instantly to the user's UVM account by using the credit card or the bank account that the user provided at the time of registration. The amount to be added is the shortage of the cost of the purchase plus the Top Off amount such that the available fund in the user's UVM account after the completion of the purchase is restored to the Top Off amount.

In the post pay mode, the user registers at the UVM and creates an account. The UVM provides the user's UVM account a certain amount of available credit as pre-determined by the UVM operator. This amount is called the Negative Top Off amount. The payment for the purchase transaction is made from the available credit limit of the user's UVM account. When the cumulative purchase amount reaches or is to exceed the available credit limit, the present invention charges the user's credit card or the bank account provided by the user at the time of registration, an amount so that the user can make the purchase and bring the user's UVM account balance to zero and restore the user's available credit limit to the Negative Top Off amount.

This automatic Top Off instant add fund method in the pre-paid mode and automatic Negative Top Off instant charge to the user's credit card or the bank account in the post pay mode avoids the need for the user or cashier to manually enter the payment amount and therefore provides convenience and speedy payment.

Because the cost of the purchases are paid for using the user's UVM account of the present system and method without having a third party involved, the checkout process is very fast and allows the vendor to reduce overhead cost. The UVM operator will settle with each vendor upon reaching a pre agreed thresholds either by amount or by time.

For user's security, the present system permits the user to set spending thresholds by the amount per purchase, per day, per week and per month to reduce the risk. The system automatically sends e-mail to the user when there is any activity in the user's account. The user may also check the daily transaction records by log-in to the UVM and access transaction record pages. Both features allow the user to discover early any unauthorized use of the user's account.

The present system also provides users an additional means for security and minimizes losses by allowing the user to lock the account upon discovery of unauthorized use of the user's account or in case the user loses the cell phone loaded with the User ID Barcode or 2 in 1 credit card printed with the User ID Barcode or the user's account password is stolen.

The present system provides user privacy. When the user purchases goods either on line or offline using the User ID Barcode loaded in a cell phone as an alternative to a conventional credit card or 2 in 1 credit card printed with the User ID Barcode, the system does not require the user to register with the vendor or provide any user's personal information to the vendor. Another important feature of the present system relates to protection of privacy. The user usually records the telephone number of friends that they call often on the cell phone. Upon receiving report of the loss of the cell phone from the user, the UVM may erase everything recorded in the cell phone including the User ID Barcode as soon as the cell phone power is turned on.

One of many incentives each credit card company offers to users is to award each user incentive points proportional to the amount of charges for purchases. However, the user usually does not receive any incentive if the purchase of goods is priced at the micro payment level and the user pays for the purchase by cash. The present system provides the user incentive points even for micro payment purchases because payments for micro payment purchases are made using the fund or available credit limit in the user's UVM account and the loading of funds into the user's UVM account or payment of available credit limit for the user's UVM account is made using the user's credit card. Therefore, the present system provides the user incentive points for each and every purchase regardless of the amount of the purchasing transaction that the user makes.

The present system and method introduces an automatic registration process in which the cell phone holder will automatically be registered with the micro payment transaction server computer such as the UVM as described, upon the first use of the User ID Barcode loaded in the cell phone or 2 in 1 credit card printed with the User ID Barcode for purchasing low cost items at a participating vendor. The UVM may request the user personal information from the cell phone company's database or the credit card company's database so as to avoid the user to re enter user's detail personal information repeatedly thus the automatic registration process provides convenience to the user. In this automatic registration process, the user will be asked to provide User ID and Password at a later time.

The present system and method also introduces an automatic registration process for a vendor when the vendor accepted for the first time the user to pay for the goods the user is purchasing using the User ID Barcode. The UVM operator may obtain more detail vendor information at a later time including establishing an agreement for the settlement thresholds either by time or by the amount.

There are many pre-paid cards or IC cards available in the market. The pre-paid card does allow the user to pay for transaction amount in micro payment levels. However, the user is required to purchase a new pre-paid card when the remaining amount of cash in the pre-paid card runs out or becomes too small to make the purchase. This is inconvenient for the user. The pre-paid card issuers offer some incentives that sometime attract users. Since pre-paid cards can be used only at the vendor sites specified by the pre-paid card issuer, a user may end up having several pre-paid cards. If a user looses the pre-paid card, the remaining amount of money in the card is lost.

The present method and system uses the User ID Barcode for personal identification. When the User ID Barcode is downloaded into the user's cell phone, the cell phone can be used to make purchases of goods similar to a conventional credit card except the use of User ID Barcode allows the user to charge goods, costing in micro payment level in addition to purchase of normal price range products whereas a conventional credit card usually does not allow charging goods costing in micro payment levels. Furthermore, the User ID Barcode, being captured by the cashier using the scanner available at the cash register, provides fast checkout and with limited cost to the vendor for the transaction processing.

Referring to FIG. 1(a), a conventional credit card transaction processing is shown. The barcodes for products being purchased are captured using a Barcode Scanner 10 available at the vendor Cash Register 20 as shown in step 1. The description of the product such as product name and the price is shown at the cash register Display 30, step 2. When all purchased products are entered at the Cash Register 20, the user is asked to swipe the credit card at the Credit Card Reader 40 attached to the Cash Register 20, as shown in step 3. The transaction data, which includes the vendor ID, the product description, the total purchasing amount, the user credit card number and others information are transmitted to the Card Transaction Processing Center 50, as shown in step 4. The Card Transaction Processing Center 50 authenticates the card to detect such problems as a fake card or an invalid card and then transmits the transaction data to the Credit Card Company 60 as shown in step 5. The Credit Card Company then checks to see if the owner of the credit card has good credit rating and if so, it checks to see if the total amount to charge for the purchase or other transaction is within the credit limit given to the user.

Upon satisfying these and other conditions, the Credit Card Company 60 sends the approval signal back to the Card Transaction Processing Center 50 as shown in step 6. The Card Transaction Processing Center 50 in turns sends the approval signal back to the Credit Card Reader 40 as shown in step 7. The user signs at the Credit Card Reader display 70, step 8. The final approval signal is than sent to the Cash Register Display 30, step 9 and it prints out the Sales Slip 80 as shown in step 10 and that completes the purchasing transaction. If either Card Transaction Processing Center 50 or the Credit Card Company 60 does not approve the transaction, the rejection signal is sent to the cash register Display 30 and the transaction is canceled.

Figure 1B:
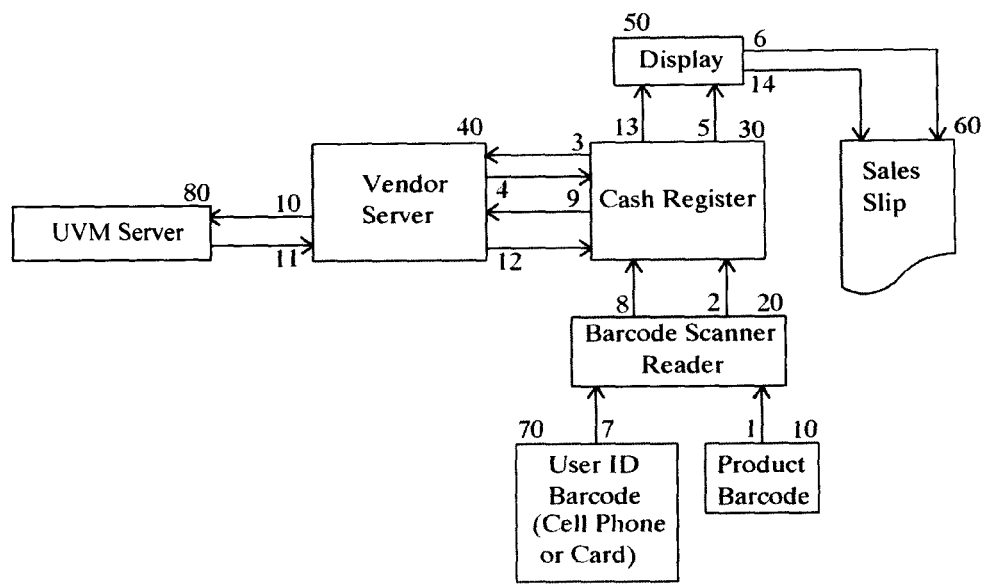

FIG. 1(b) describes the purchasing transaction processes using the User ID Barcode loaded in a cell phone or printed on a credit card. The user's cell phone number prefixed with a special character or the user's credit card number prefixed with a special character is converted into a barcode format to become the User ID Barcode for personal identification. Pre-fixing, attaching, or both, a special character to the cell phone number or the credit card number then converting it to the barcode format as the User ID Barcode is necessary in order for the vendor server to distinguish the User ID Barcode from the product barcode. The product barcode 10 being purchased is captured using a Barcode Scanner Reader 20, step 1, and it is sent, step 2, through Cash Register 30 to the Vendor Server 40, step 3. The Vendor Server 40 sends the description of the product including the price back to the Cash Register 30, step 4 and it is displayed at the cash register Display 50, step 5 and it is printed in the Sales Slip 60, as shown in step 6. When all purchased products are entered at the Cash Register 30, the user is asked to make the payment. The user shows the User ID Barcode as displayed in the cell phone or printed on the back of the credit card to the cashier. The cashier captures the User ID Barcode 70, using the Barcode Scanner Reader 20, step 7.

The Barcode Scanner sends the User ID Barcode it captured to Cash Register 30, step 8, and the Cash Register 30 sends the transaction data which includes the vendor ID, the product description, the total purchasing amount, the User ID Barcode and others information to the Vendor Server 40, step 9. The Vendor Server 40 detected the special character in the User ID Barcode indicating that the barcode does not represent any products for sale and it is the User ID Barcode, the Vendor Server 40 sends the User ID Barcode together with the transaction data to the UVM Server 80, step 10.

The UVM Server 80 access the user's UVM account and checks to see if the user has enough funds or available credit limit in the user's UVM account. If yes, the UVM Server 80 subtracts the cost of the good from user's UVM account and sends the approved signal back through the Vendor Server 40, step 11, to the Cash Register 30, step 12. The Cash Register 30 displays the approved signal, step 13 and prints out the Sales Slip 60 as shown in step 14. This completes the purchasing transaction. If the user does not have enough funds or available credit limit in the user's UVM account or there is any problem with the user's UVM account, the UVM server 40 sends the rejection signal to the cash register display 30 and the transaction is cancelled.

It is to be noted that other methods such as Radio Frequency Identification (RFID) or Near Field Communication (NFC) technology may be used to capture user's identification number but such techniques require the purchase and use of an RFID or NFC reader. The present invention permits the use of existing barcode readers that are already present in commercial establishment. Also, other sources for the user identification such as driving license number or social security number, converted into barcode format, may be used to identify the user instead of the user's cell phone number or credit card number as described herein.

Figure 2A:
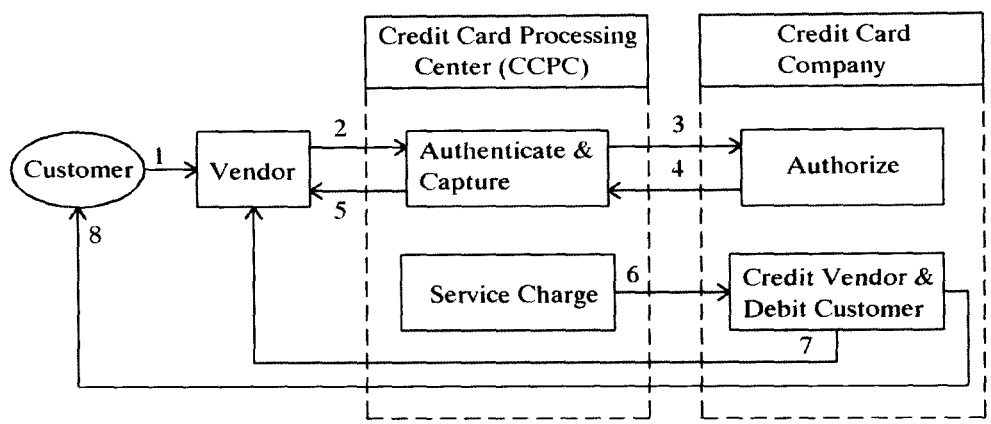
FIG. 2(a) describes conventional credit card transaction processing.

FIG. 2(a) describes the conventional credit card transaction processing in more detail. The Customer purchases goods at a Vendor and swipes the credit card, as shown in step 1. The Vendor sends the transaction data including the vendor ID, the purchased product description, total purchasing amount, customer's credit card number and others information to the Credit Card Processing Center (CCPC), step 2. The CCPC captures the transaction data and authenticates the credit card. Then, the CCPC sends the transaction data to the Credit Card Company as shown in step 3. The Credit Card Company checks to see if the purchasing amount is within the user's credit limit and other information than sends the authorization code to the CCPC, step 4 who in turns sends the authorization code to the Vendor, as shown in step 5 and that completes the user's purchasing transaction. The CCPC aggregates service charges for the credit card authentication services for each credit card company. When the service charge amount for a credit card company reached the thresholds as pre-determined between the CCPC and the Credit Card Company, the CCPC sends the invoice to the Credit Card Company as shown in step 6. The Credit Card Company sends the invoice to the Vendor as pre-determined between the Vendor and the Credit Card Company for the cost of customer's purchases less services charges as shown in step 7. The Credit Card Company sends invoice to the Customer each month for the total purchases of goods or services made by the Customer during the month as shown in step 8.

Figure 2B:
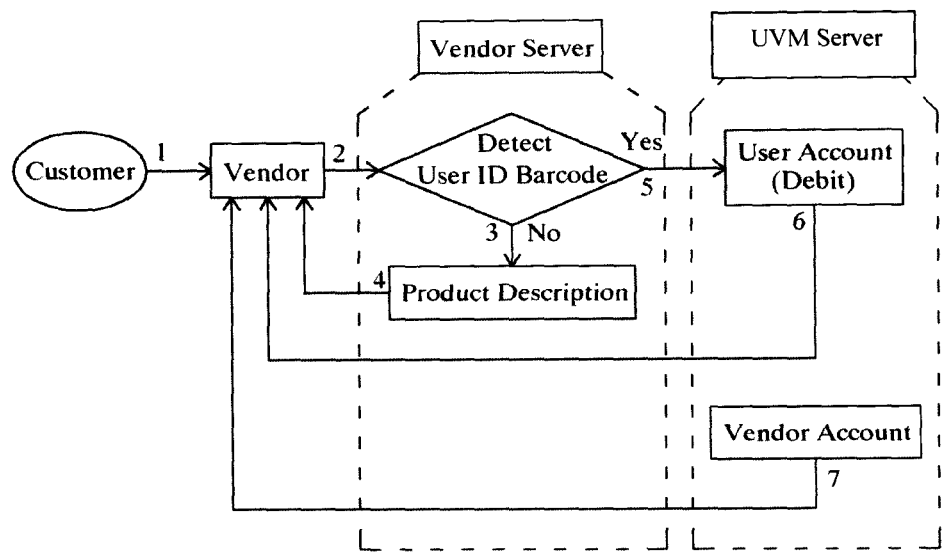
FIG. 2(b) describes the transaction processing of the present invention using the User ID Barcode.

FIG. 2(*b*) describes in more detail the transaction processing when the customer uses the User ID Barcode for the settlement of the purchases. The Customer purchases goods at a Vendor and the cashier captures product barcodes or the User ID Barcode, as shown in step 1. The Vendor sends the transaction data including vendor ID, the product barcode or the User ID Barcode to the Vendor Server step 2. The Vendor Server checks the barcode data it received from the Vendor to see if it is the User ID Barcode. If not, the barcode data represents the product, step 3 and the process goes back to Vendor, step 4. If yes, the Vendor Server sends the transaction data including the User ID Barcode to the UVM Server, step 5. The UVM Server checks to see if the Customer has enough fund or available credit limit in the user's UVM Account to cover the cost of the purchase. If yes, the UVM Server subtracts the cost of the purchase from the fund or available credit limit in the user's UVM Account and sends the approval signal to the Vendor through the Vendor Server, step 6, and that completes the purchasing transaction. The UVM Server sends the invoice to the Vendor periodically as pre-determined between the UVM and the Vendor for the cost of the customer's purchase less service charges as shown in step 7. Note that neither the CCPC nor any credit card company is involved in the purchasing transaction processing. The UVM is in fact the CCPC and a credit card company of its own in this case Other methods rather than the User ID Barcode can be used to identify the user. One such alternative method is the use of cell phone with RFID tag or NIF chip. The cash register at the vendor site will have RFID tag or NIF chip reader to capture the user's identification number. Other means for the user identification such as driving license number or social security number may also be used for the present invention.

Figure 3:
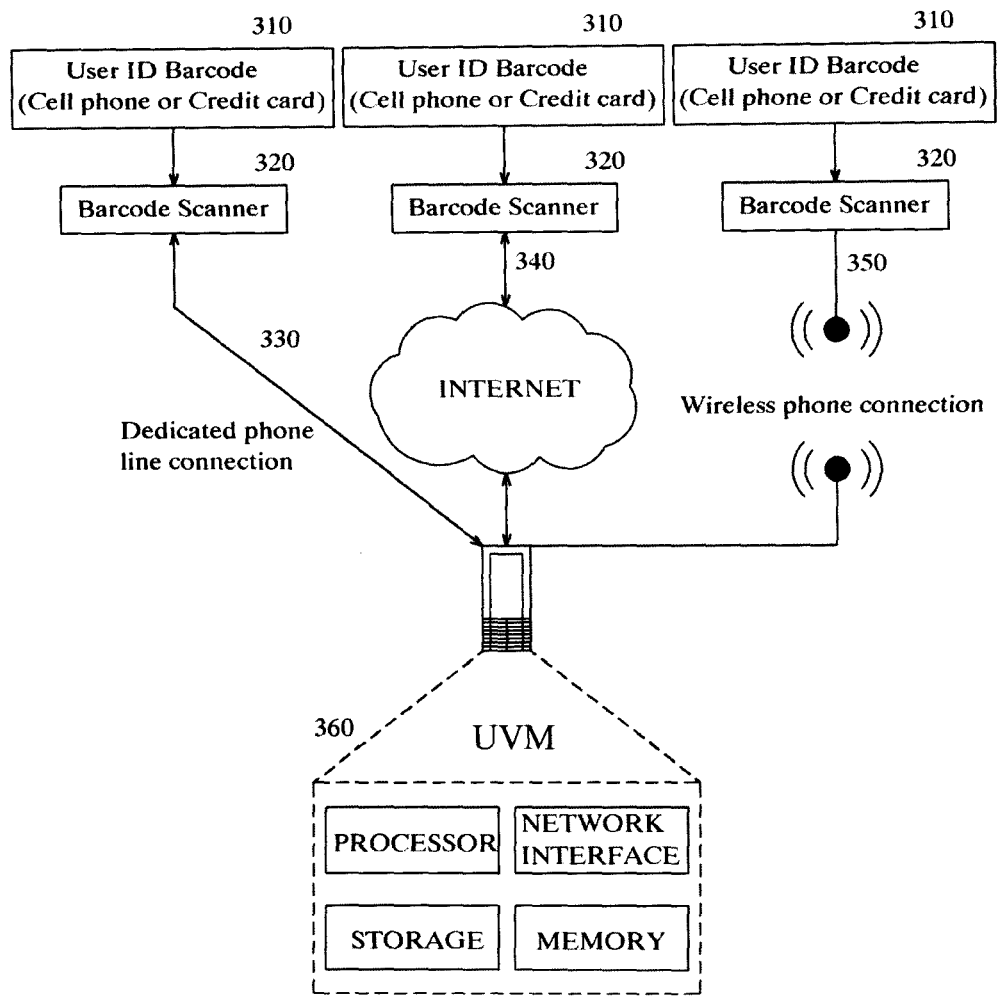
FIG. 3 is an overview of the net worked environment in which the present technology is used.

Referring now to FIG. 3, the networked environment and apparatus of the present invention are described. The user cell phone loaded with the User ID Barcode or card printed with the User ID Barcode, 2 in 1 card 310 is used to make the purchase at the participating vendor. The barcode scanner 320 is used to capture the product's barcode the user is purchasing and the User ID Barcode. The transaction data including the vendor ID, the description of the products, the amount of the purchase and the User ID Barcode is sent to the UVM through the dedicated phone line 330 or the Internet 340 or the wireless phone connection 350.

The transaction processing server computer, UVM 360 checks to see if the user's UVM account has enough funds or available credit limit to cover the cost of the product purchased. If so, the UVM subtracts the cost of the product from user's UVM account and sends the approval signal to the vendor cash register and that completes the purchasing transaction. If the user's UVM account does not have enough funds or available credit limit to cover the cost of the purchase, the transaction is canceled.

Figures 4, 4A:
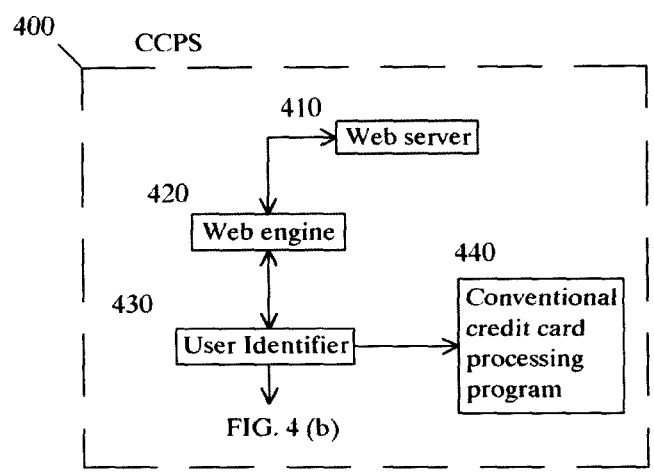
FIG. 4(a) is a diagram of the technology executing on a server of the card processing company.
Figure 4:
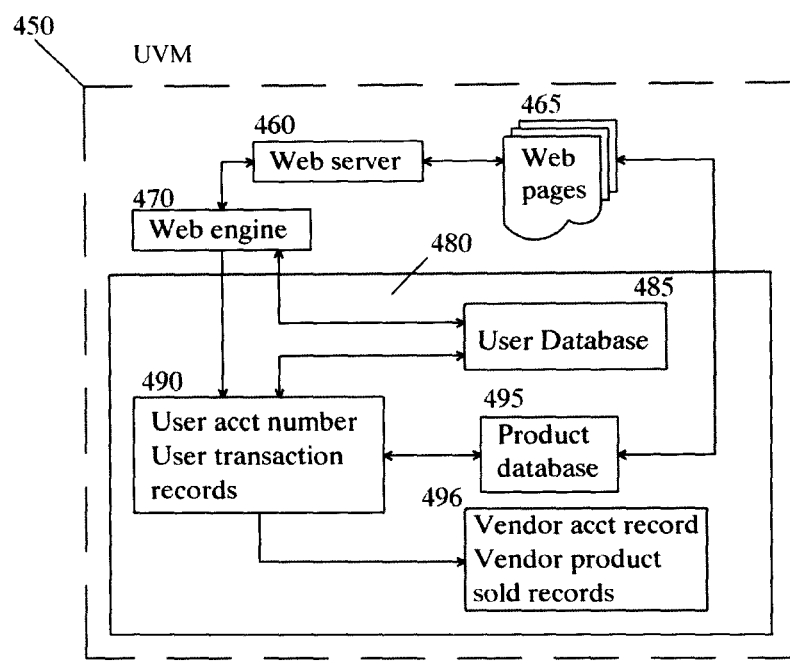
FIG. 4(b) is a diagram of the technology executing on a server built in accordance with the principles of the present invention.

Referring now to FIG. 4(*a*), the conventional credit card transaction processing server computer, CCPS, 400 as shown, and is described in greater detail. Web server 410 displays content or products that the vendor may sell on the web. Web server 410 may also display the list of participating vendors for users to make purchases offline. When a user makes an online purchase, the process goes through Web engine 420 to User Identifier 430. The User Identifier 430 passes the transaction data including the vendor ID, the purchasing items descriptions, the cost of goods the user purchased, the total amount of the purchase and the user's credit card number to the conventional credit card processing program 440 within the CCPS 400. Similarly, if the user makes the purchase offline at the participating vendor, the vendor cash register sends the transaction data including the vendor ID, the purchasing items descriptions, the cost of goods the user purchased, the total amount of the purchase and the user's credit card number to the conventional credit card processing program, 440 within the CCPS 440. Note that the cost of the transaction processing by CCPS and the service charge for the purchasing transaction processing by the credit card company is expensive; therefore the purchasing amount using the conventional credit card usually is more than the micro payment thresholds, say $5.00. The user may pay for the purchase in cash or other means if the purchasing amount is less than say, $5.00 in micro payment level.

In case the vendor accepts the user's purchases even though the purchasing amount is within the micro payment level using the credit card or if the user makes the purchase at a participating vendor offline regardless of the amount of the purchase using the user's cell phone loaded with the User ID Barcode or 2 in 1 card which has the User ID Barcode printed in the back of the card, the user identifier 430 transfers the transaction data to the UVM server computer 450 as described in FIG. 4(*b*).

FIG. 4(*b*) describes the UVM server computer in greater detail. The user registers as a member and opens an account with the UVM. The UVM manages the user's account, processes the user's purchase transactions, adds funds to the user's account in the pre-paid mode or clears the user's available credit limit in the post pay mode, using the user's credit card or bank account as provided by the user at the time of the registration.

The UVM server computer 450 includes processor 480 which has the memory for the storage of User Database 485, the User account number and the User transaction record 490, the Product database 495 and the Vendor account record and the Vendor product sold record 496. In a preferred embodiment, the UVM server computer 450 executes web server software 460, web engine 470 and a computer interface software through which each purchasing transaction is processed and recorded. The UVM server computer 450 may execute database software, which stores information on the user's account, user's purchasing records, products user purchased, vendor information and settlement status the UVM has made with each vendor.

It will be understood by one skilled in the art that functions performed by the User Vendor Management Server computer UVM 450 may be performed by several computers. In a situation where the UVM server is handling a high volume of purchasing transactions, it may be necessary to distribute the tasks performed by User Vendor Management Server computer UVM 450 among several computers for performance reasons.

The processing of user's purchasing transaction as performed by the UVM server computer 450 is independent of any third party software, therefore there is no cost of processing for each transaction other than the initial cost of installing the UVM server computer 450.

The transaction server computer 450 will have the feature allowing the user to set spending thresholds per purchase, per day, per week and per month so as to minimize the potential loss in case the user loses the cell phone downloaded with the User ID Barcode or credit card with the printed User ID Barcode or the user password is stolen. Furthermore, the transaction server computer 450 will send an e-mail containing the user transaction data, date and time that the transaction took place to the user for each transaction made allowing the user to confirm the purchase. The e-mail message may contain a link for the user to lock the use's UVM account in case the user finds that there is an unauthorized use of the user's UVM account.

The transaction server computer 450 also maintains the algorithm for the User ID Barcode encryptions using the time variant method or user variant method or both.

Figure 5A:
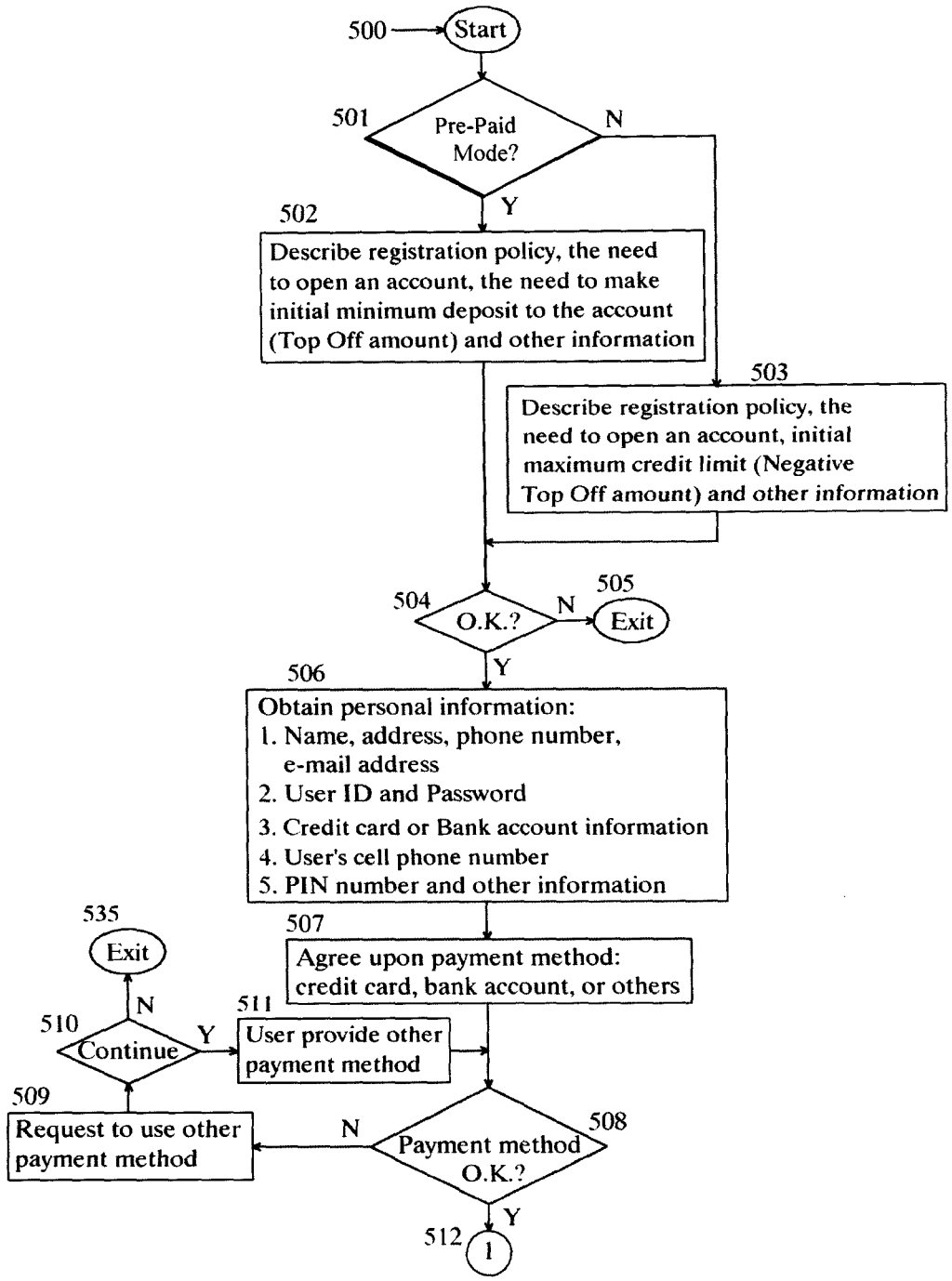
FIGS. 5(a) and 5(b) describe the user registration process at the UVM.
Figure 5B:
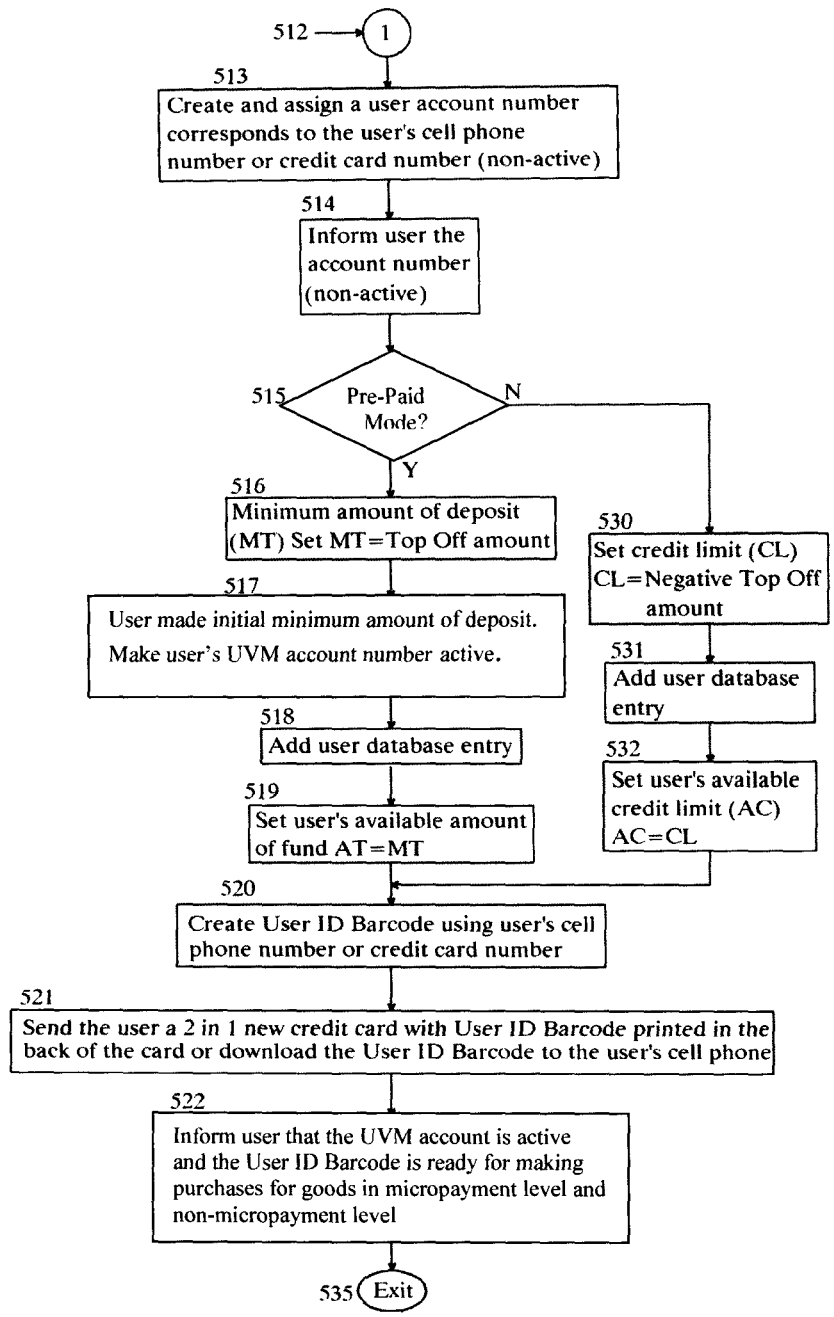

FIGS. 5(a) and 5(b) describe the user registration process with the present method and system. In a preferred embodiment of the present invention, a user can register and establish an account over the network (online method) or using telephone, facsimile machine or e-mail. It should be noted that as used herein, the use of e-mail between the user's personal computer (PC) or the user's cell phone and the UVM operator of the present invention is considered as an offline method, since communications using e-mail is not a part of the business transaction between the user's client computer and the UVM server computer.

The registration and establishment of an account with the UVM operator, either using online method or offline method requires the user to provide the UVM operator the personal information including, name, User ID, Password, user address, cell phone number, facsimile machine number, e-mail address, etc. To properly and securely identify a user, the UVM operator may require additional private information from the user that may include the maiden name of the user's mother, the user's social security number and a password for use as a Personal Identification Number (PIN). As used herein, this personal private information is collectively called "other identifiers". These other identifiers are used from time to time to ensure proper identification of the user. The user may change his or her Password or PIN at any time if so desires. The UVM may obtain certain user's information from the cell phone companies or credit card companies in which the user's has an account. This automatic registration feature reduces the need for the user to provide detailed personal information and thus it is convenient to the user.

The system and method of the present invention allows the UVM operator to operate the system either as a pre-paid mode or as a post pay mode. The registration process starts with inquiry for either pre-paid mode or post pay system in 501, as shown in FIG. 5(a). For the pre-paid mode, the system describes the registration policy, the need to open the UVM account, the need to make the initial minimum amount of deposit in the UVM account as required by the UVM (Top Off amount) and other information, as in 502. For the post pay mode, the system describes registration policy, the need to open an account, and the initial maximum available credit limit that is equivalent to the Negative Top Off amount and other information, as in 503. In 504, the system asks if the user wants to proceed. If not, the process exits as in 505.

If the user wants to proceed, the system obtains the user personal information which includes name, address, phone number, e-mail address, User ID and Password, credit card or bank account information, user's cell phone number, Personal Identification Number (PIN), and other information as described in 506. In 507, the system agrees upon the user's payment method, either a credit card or the bank account or other methods. In 508, the system decides if the payment method provided by the user is acceptable and if so, it proceeds to 512. If not, the system asks the user for other payment method in 509. In 510, the system checks to see if the user wants to proceed. If yes, the process goes to 511 where the user provide other payment method and goes to 508 where the system repeats to check if the payment method provided by the user is acceptable. If the user does not want to proceed, the system proceeds to 535 and exits.

From 512, the process goes to 513 where the system creates and assigns the user UVM account number that corresponds to the user's cell phone number or credit card number. In 514 the process informs the user the account number. The account number is inactive at this time.

In 515, the process asks if the system is a pre-paid mode. If so, it sets in 516 the minimum amount of deposit (MT) that the user is required to deposit into the user's UVM account. This minimum amount of deposit MT is to be called as the Top Off amount. In 517, the user made the initial minimum amount of deposit into the user's UVM account and the user's UVM account is than set as active. In 518, the process adds the user to the database entry and set the user's available amount of funds AT equal to MT in 519. In 520, the system creates the User ID Barcode using user's cell phone number or credit card number and in 521, the system sends to the user the card (or other media) printed with the User ID Barcode (the 2 in 1 new credit card) or download the User ID Barcode to the user's cell phone. In 522, the system informs the user that the UVM account is active and it is ready for making purchases of goods either in micro payment level or non-micro payment level using the User ID Barcode. The user completes the registration process and exits in 535.

If the system is to be operated as a post pay mode, the system sets the Credit Limit (CL) to be negative of the Top Off amount as indicated in 530. The system then adds the user to the database entry in 531 and sets the user's available credit limit AC equal to CL in 532 than goes to 520 where the system creates the User ID Barcode and in 521, the system sends to the user the card (or other media) printed with the User ID Barcode (the 2 in 1 new credit card) or download the User ID Barcode to the user's cell phone. In 522, the system informs the user that the account is active and ready for making purchases of goods priced in either micro payment levels or non-micro payment level using the User ID Barcode. The user completes the registration process as indicated in 535.

Figure 6:
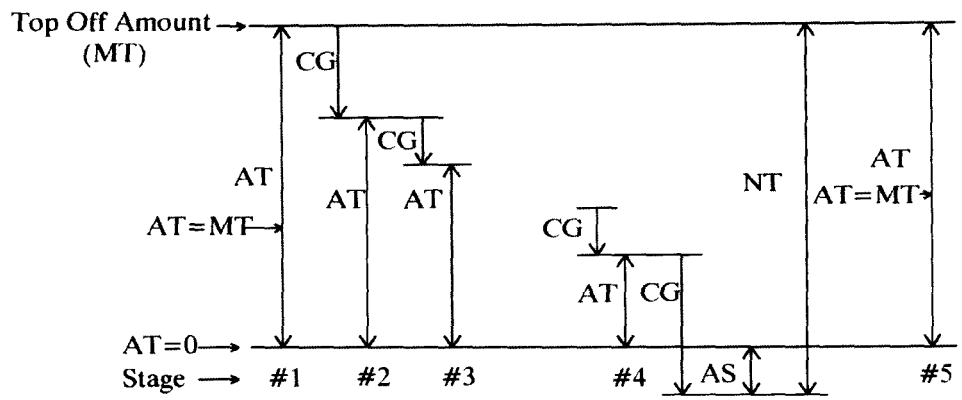
FIG. 6(a) shows the user UVM account balance after each purchasing transaction in a pre-paid mode.
FIG. 6(b) shows the user UVM account balance after each purchasing transaction in a post pay mode.
Figure 6:
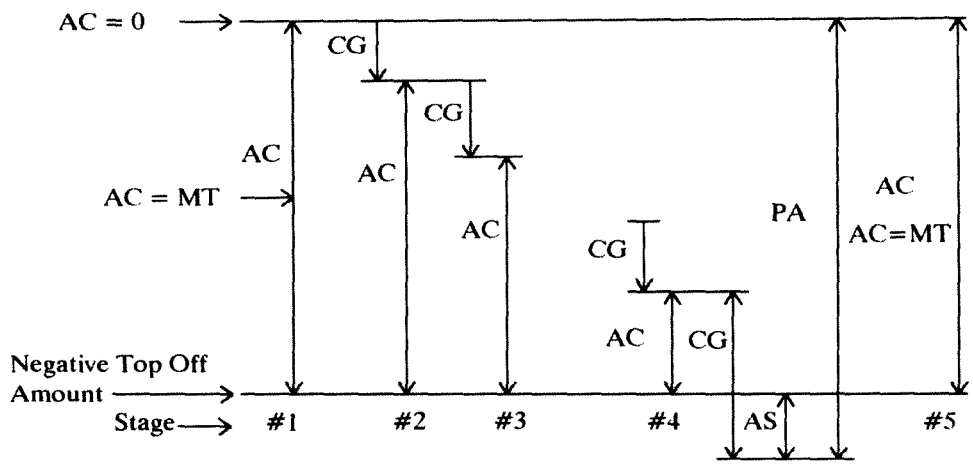

FIG. 6(a) shows the user account balance after each purchasing transaction in a pre-paid mode. In initial stage #1, the user has the available amount of fund AT that is equal to Initial minimum amount of deposit MT (Top Off amount). In stage #2, the user made a purchase with the cost of goods CG and the cost of good CG is subtracted from the available amount of fund AT in the user's UVM account. Stage #3 shows that the user made more purchases and the cost of good for the purchase is subtracted again, from the available amount of fund AT in the user's UVM account. In stage #4, the user's available amount of fund is not enough to cover the cost of good CG and the amount of fund that are short to make the purchase is AS. The system automatically Add Fund to the user's UVM account by charging the user's credit card (or the bank account whichever the user's payment method is registered) the amount NT that is AS, the amount short to make the purchase plus the Top Off amount MT. The resulting balance in the user's account after this purchasing and Add Fund processes is MT, the Top Off amount. This automatic add fund process using Top Off concept without requiring the user to enter the amount to be added to the user's account as described above is a very important feature of the present invention since it provides a very fast means for checkout at the vendor cashier.

FIG. 6(b) shows the user account balance after each purchasing transaction in a post pay mode. In initial stage #1, the user has the available credit limit AC equals to the initial maximum credit limit allowed MT (Negative Top Off amount) when the use opens a UVM account. In stage #2, the user made a purchase with the cost of goods CG and the amount of the cost of good is subtracted from the user's available credit limit AC for the user's UVM account. Stages #3 shows that the user made more purchases and the cost of good CG for the purchase is subtracted again, from the available credit limit AC in the user's UVM account. In stage #4, the user's available credit limit AC is not enough to cover the cost of good CG and the amount of the credit limit exceeded is AS. The system automatically charges the user's credit card (or the bank account whichever the user's payment method is registered) the payment amount PA that is AS, the amount exceeded the available credit limit AC plus the initial maximum credit limit allowed MT. The resulting balance in the user's account after this purchasing transaction and the payment amount PA is zero and the user's available credit limit AC is restore to the initial maximum credit limit allowed MT. Again, this automatically charging the user's credit card (or bank account as provided by the user at the time of the registration) to clear the account balance to zero and restore the available credit limit AC to MT without requiring the user to enter the amount to be charged to the user's credit card (or bank account) as described above is a very important feature of the present invention since it provides a very fast means for checkout at the vendor cashier.

Figure 7A:
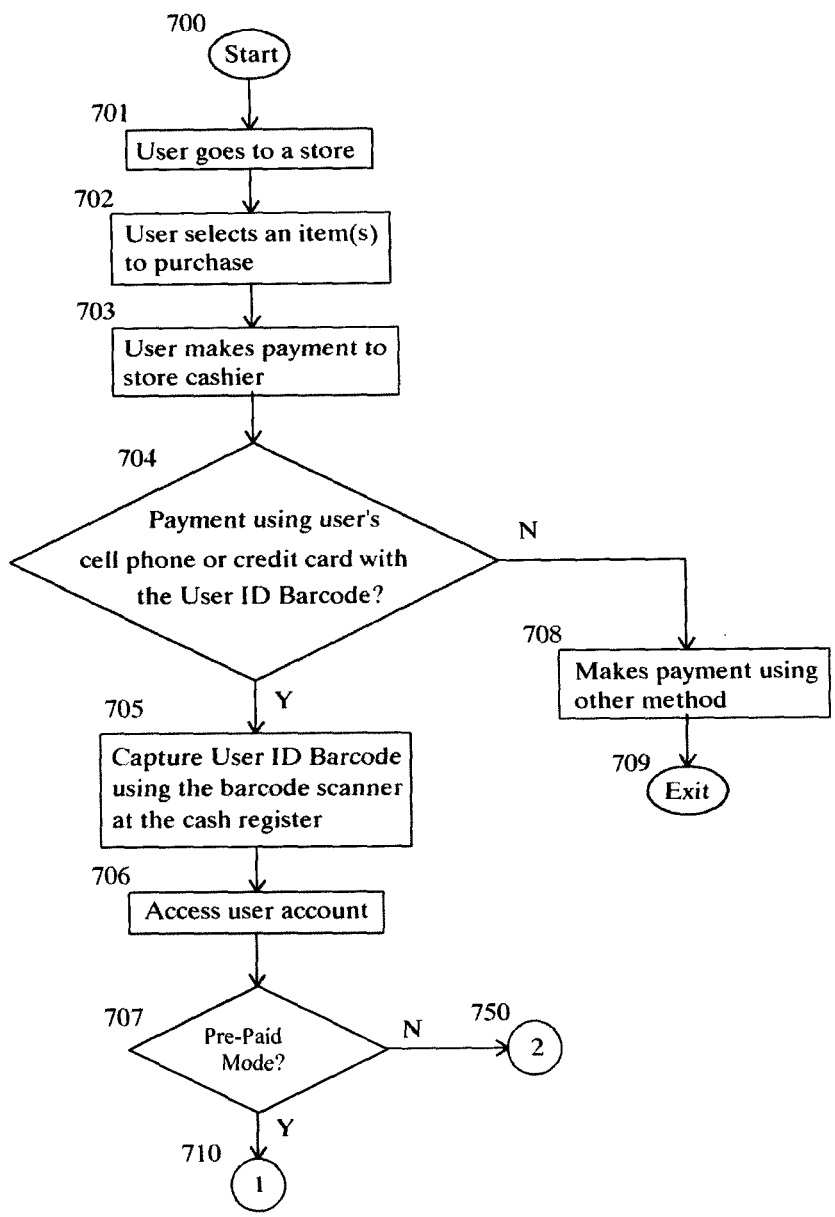
FIG. 7(a) shows the purchasing process.

FIG. 7(a) shows the purchasing process. The user goes to a store shown in 701 and select item or items to purchase as shown in 702. The user makes payment to a store cashier in 703. In 704, the store cashier asks if the payment is to use the cell phone or credit card with the user ID Barcode. If not, the user makes the payment using other method at 708 that completes the transaction and exit at 709. If the user is to use the User ID Barcode for the payment, the cashier captures the User ID Barcode in 705. The User ID Barcode allows the process to access the user's UVM account in 706. If the system is a prepaid mode, the process goes to 710 in FIG. 7(b). If the system is a post pay mode, the process goes to 750 in FIG. 7(c).

Figure 7B:
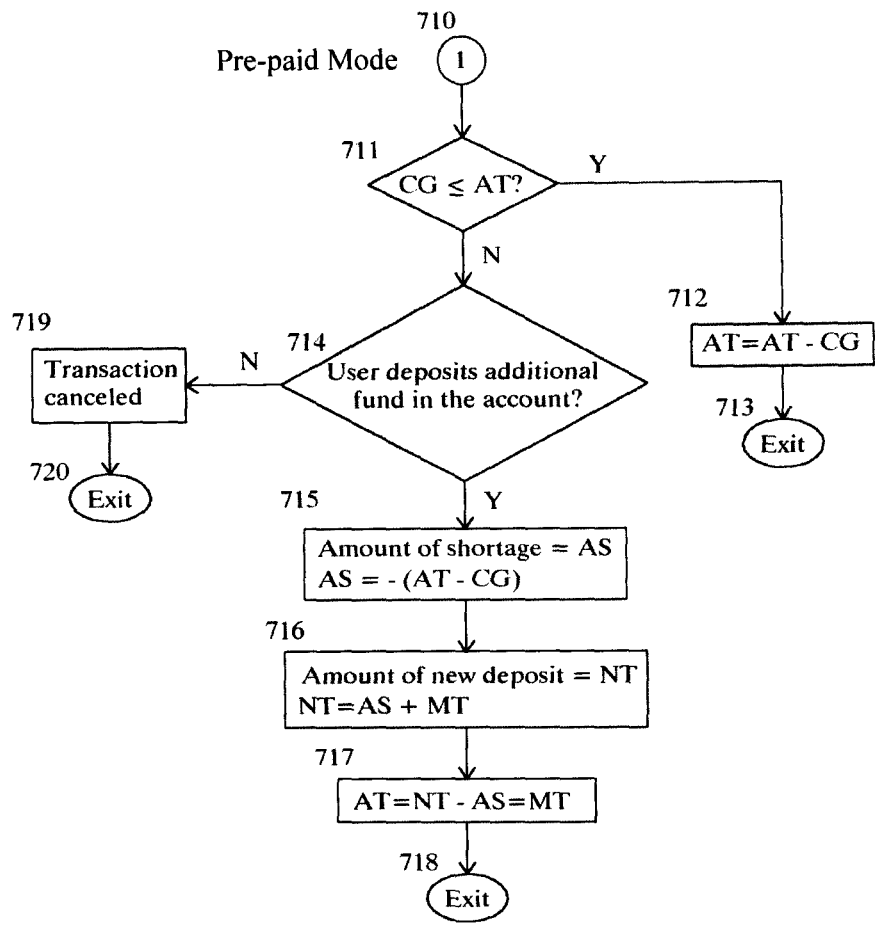
FIG. 7(b) shows the purchasing process in a pre-paid mode.

FIG. 7(b) shows the purchasing process for the pre-paid mode. The process asks in 711 if the cost of good CG is less than or equal to the available fund AT in the user's UVM account. If yes, the cost of goods is subtracted from the available fund AT or AT=AT−CG in 712 and exit at 713. If the cost of goods (CG) is greater than the available fund AT, than the process asks if the user wants to add more fund to the account at 714. If not, the transaction is cancelled as shown in block 719 and the process exits at 720.

If the user want to add more fund, the amount of shortage AS is computed AS=negative of (AT−CG) as shown in 715 and the amount of fund NT to be added will be the shortage amount AS plus the Top Off amount MT or NT=AS+MT as shown in 716. The available amount of fund after the purchasing of the good and adding more fund in the user's UVM account will be AT=NT−AS=MT, the Top Off amount, as described in 717. This completes the purchasing and adding fund transactions and the process exits at 718.

Figure 7C:
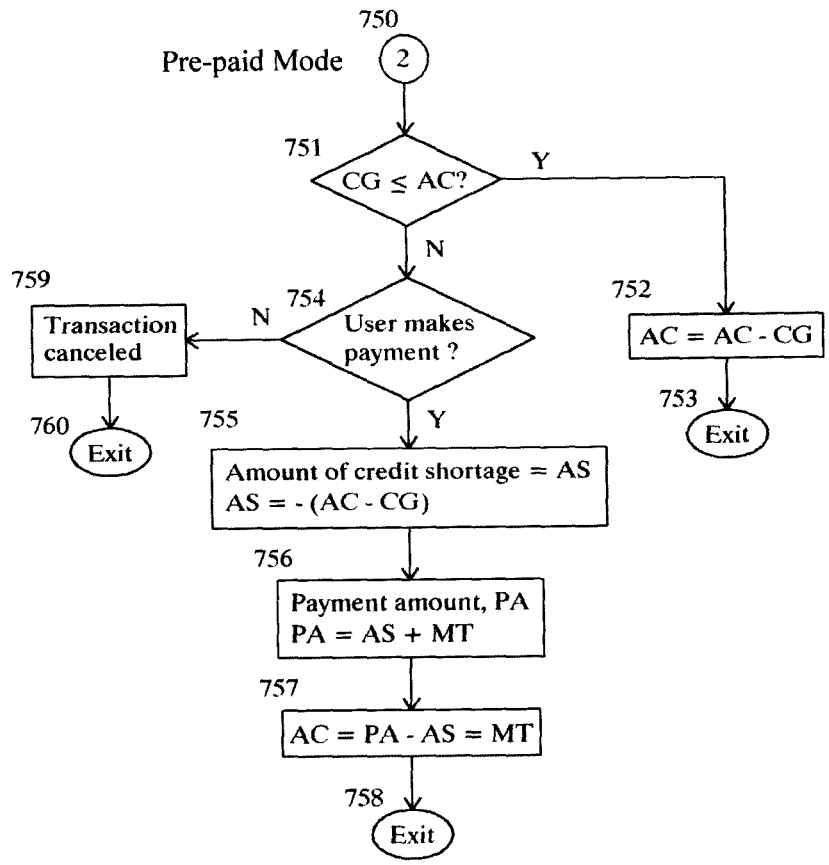
FIG. 7(c) shows the purchasing process in a post pay mode.

FIG. 7(c) shows the purchasing process for the post pay mode. The process asks in 751 if the cost of good is less than or equal to the available credit limit AC in the user's UVM account. If yes, the cost of goods is subtracted from the available credit limit AC or AC=AC−CG in 752 and exit at 753. If the cost of good CG is greater than the available credit limit AC, than the process asks if the user wants to make the payment to clear the credit limit at 754. If not, the transaction is cancelled in block 759 and the process exits at 760.

If the user wants to make the payment to clear the credit limit, the amount of credit shortage (AS) is computed AS=negative of (AC−CG) as shown in 755. The minimum amount of payment PA will be the amount of shortage AS plus initial maximum credit limit allowed which is the Negative Top Off amount MT or PA=AS+MT as shown in 756. The available credit limit after the purchasing of the good and the payment will be AC=PA−AS=MT, Negative Top Off amount as described in 757. This completes the purchasing and the payment transactions and the process exits at 758.

Figure 8:
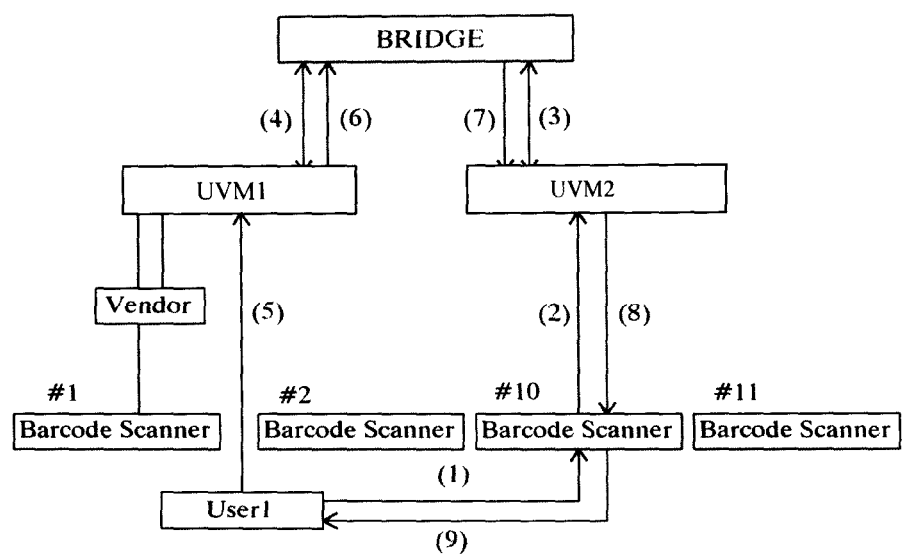
FIG. 8 describes the purchasing logics when a user registered at a UVM makes purchases at a vendor of another UVM.

FIG. 8 is a diagram showing the purchasing process when User1 registered at UVM1 makes a purchase at a vendor belonging to another UVM operator UVM2. In step (1), the vendor cashier captures the user's User ID Barcode for the purchases the user made. In step (2), the transaction goes to UVM2 for authentication. UVM2 found that the User1 is not a user registered at UVM2 and requests the BRIDGE in step (3) to authenticate the user from other UVM operator, UVM1 in the example shown. BRIDGE inquires UVM1 in step (4) to see if User1 has registered with UVM1 and if so, to see if the User1's account has enough fund to cover the cost of good. If yes, the cost of good is subtracted from the available fund or available credit limit in the User1's account in step (5). In step (6), the process responds to BRIDGE that the purchasing transaction is approved and in step (7), BRDGE informs UVM2 the approval for the transaction. In step (8), UVM2 sends the approval signal to the cash register at the vendor site and that completes the transaction in step (9).

BRIDGE settles with each UVM operators under its control when the amount or time reaches the thresholds previously agreed upon among all UVM operators. UVM1 may receive a certain commission from UVM2 because User1 registered at UVM1 made a purchase at a vendor of UVM2. In addition, UVM1 and UVM2 may pay BRIDGE for its service. This service fee is called Toll Charges similar to highway toll. UVM1 settles with the vendor when it reaches previously agreed thresholds either by the amount or time.

Figure 9:
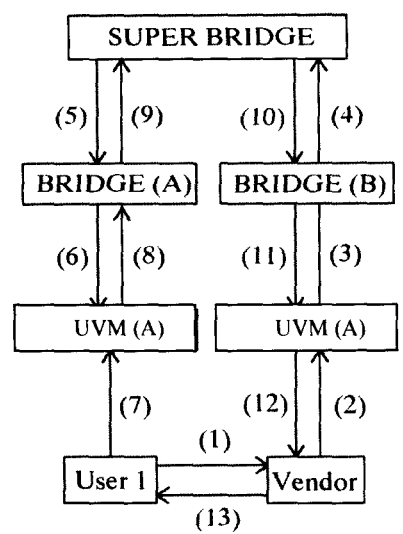
FIG. 9 is an example of the logic when a user makes purchases at a vendor of a different currency for international commerce transactions.

FIG. 9 is an example of the logic when a user makes purchases at a vendor of a different currency for international transaction. User1 registered at UVM (A) of country A makes a purchase at a Vendor of UVM (B) of country B in step (1). The vendor tried to obtain the approval for the sale from its UVM (B) in step (2). UVM (B) found that User1 is not a registered user and inquire for approval of the purchase from its BRIDGE (B) in step (3). BRIDGE (B) found that User1 is not a member of any of its UVM in their country B and request SUPPER BRIDGE in step (4) to locate User1 for potential international transaction.

In step (5), SUPPER BRIDGE inquires BRIDGE (A) of country A and BRIDGE (A) found that User1 is a registered user of its UVM (A) in step (6). UVM (A) subtracts the cost of good from the available fund, AT of User1's account (prepaid mode) or User1's Available Credit limit AC (post pay mode) in step (7). UVM (A) notifies BRIDGE (A) of its approval for the transaction in step (8). BRIDGE (A) in turn notifies SUPPER BRIDGE for the approval of the transaction in step (9). SUPPER BRIDGE notifies BRIDGE (B) for the approval of the transaction in step (10). In step (11), BRIDGE (B) notifies UVM (B) of the approval of the transaction and in step (12), UVM (B) send the approval signal to the Vendor cash register and step 13 completes the international purchasing transaction.

In the above transaction, BRIDGE (A) may receive certain commission from BRIDGE (B) since User1 is a member of UVM (A) who is under BRIDGE (A) made the purchase from a Vendor under UVM (B) who is under BRIDGE (B). BRIDGE (A) and BRIDGE (B) may pay certain fee to SUPER BRIDGE similar to UVM paying BRIDGE for its service as described in FIG. 8 above.

In the above international transaction, it should be noted that there exists exchange rate between two countries. The cost of the good User1 purchased in the country B needs adjustment taking into consideration of the exchange rate between the country B and country A where the payment for the cost of the good is to be made from User1's account, in step (8).

SUPPER BRIDGE, BRIDGE (A) and BRIDGE (B) need to keep the record of each transaction involving exchange rate adjustment. Alternatively, it may be desirable that User1 creates an account with UVM (B) if transactions with UVM (B) are to be taken placed frequently. In that case, with the approval from User1, UVM (B) may request UVM (A) for transferring of a copy of User1's personal information so that UVM (B) may create a User1 account within UVM (B). The User1 may use the same payment method as registered with UVM (A) or use a different payment method, such as a different credit card for the UVM (B). SUPPER BRIDGE, BRIDGE (A), BRIDGE (B), UVM (A), UVM (B) may be entitled to service fee to be decided among all parties concerned for completing the user purchase transaction.

While preferred illustrative embodiments of the present invention are described above, it will be evident to one skilled in the art that various changes and modifications may be made without departing from the invention. For example, gift certificate of certain amount of fund may be given away in contests or as incentives in addition to awarding some amount of fund in the user's account proportional to the amount of purchases similar to each credit card company normally awards points to the owner of the credit card, or different forms of online and offline payment may be accepted at the option of the UVM operators and vendors.

What is claimed:

1. A method for conducting offline electronic commerce transactions having a vendor barcode scanner and a vendor cash register comprising:
    (a) providing a personal code to a person for their use to purchase goods;
    (b) converting said personal code into barcode format to form a User ID Barcode, said User ID Barcode corresponding to said personal code and including at least one special character to distinguish the barcode as a User ID Barcode from a product barcode;
    (c) storing said personal code in said User ID Barcode format by said person for use to purchase goods and storing said personal code in a User Vendor Management Server to permit purchases to be made at a vendor;
    (d) establishing a User Account in a User Vendor Management Server corresponding to said personal code;
    (e) depositing funds in said User Account to establish a credit limit;
    (f) conducting purchases at vendors each having a vendor server wherein each purchase includes scanning product barcodes including product price and said User ID Barcode with a product barcode scanner at the vendor cash register and transmitting both product barcodes and User ID Barcode to said vendor server;
    (g) detecting the User ID Barcode at the vendor server and forwarding the ID Barcode and purchase price to said User Vendor Management Server;
    (h) comparing the purchase price with the funds in said User Vendor Management Server to determine if there are available funds within the credit limit in the User Vendor Management Server account, and if there are, sending an approval signal to the vendor server;
    (i) forwarding the approval signal to the vendor cash register; and
    (j) repeating steps (f) through (i) for subsequent purchase transactions using said User ID Barcode.

2. The method of claim 1 wherein said User ID Barcode is stored by said person in a cell phone.

3. The method of claim 1 wherein said User ID Barcode is stored by said person on a label secured to a credit card or secured to a user's cell phone.

* * * * *